June 26, 1923.

C. DE THAL 1,460,231

APPARATUS FOR THE PRODUCTION OF STEEL

Filed April 8, 1918

Inventor
C de Thal
by
W. E. Evans
Attorney

Patented June 26, 1923.

1,460,231

UNITED STATES PATENT OFFICE.

CHRISTIAN DE THAL, OF PARIS, FRANCE.

APPARATUS FOR THE PRODUCTION OF STEEL.

Application filed April 8, 1918. Serial No. 227,358.

*To all whom it may concern:*

Be it known that I, CHRISTIAN DE THAL, a citizen of the French Republic, residing at 7 Rue de l'Echelle, Paris, France, have invented certain new and useful Improvements Relating to Apparatus for the Production of Steel, of which the following is a specification.

The present invention has for its object improvements in apparatus for the production of steel. These improvements have been more especially conceived in view of their application to the apparatus for the direct production of steel described in the specification of the French Patent No. 482,978, dated the 25th November, 1915.

The present invention is essentially characterized by the arrangement and mode of construction of the lower part of a shaft furnace specially provided for the direct production of steel according to the process described in the specification of the French Patent No. 482,978, and by the application to such a shaft furnace of an electric heating arrangement that may be used for the refining of the metal obtained.

In the accompanying drawing is represented diagrammatically and by way of example a furnace constructed according to the invention.

Figure 1:
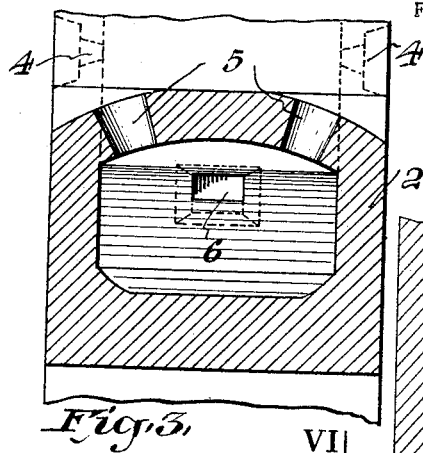
Figure 1:
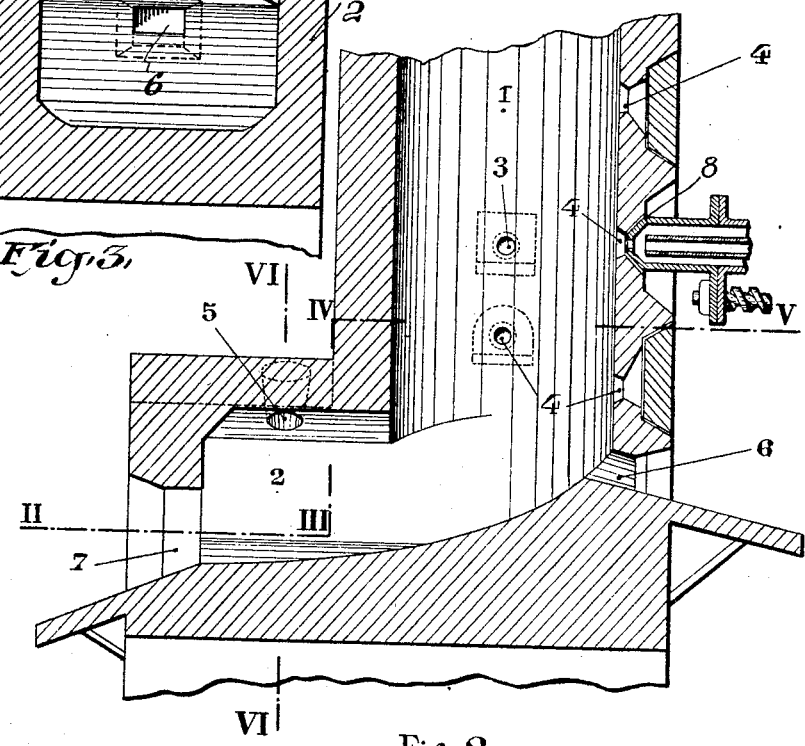
Figure 2:
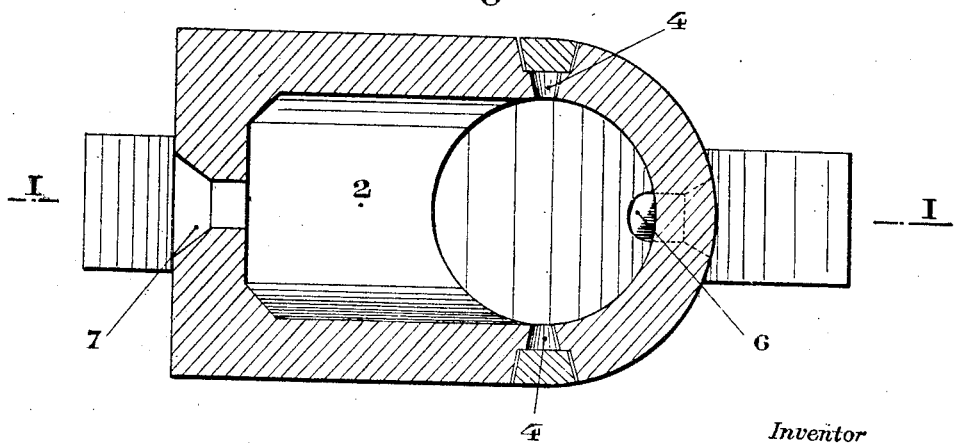

Figures 1, 2 and 3 show the arrangement of the lower part of a shaft furnace constructed according to the invention. Figure 1 is a vertical section on the line I—I of Figure 2; Figure 2 is a horizontal section on the line II—III—IV—V of Figure 1; Figure 3 is a transverse vertical section on the line VI—VI of the same figure.

As will be seen by reference to Figures 1 to 3, in a shaft furnace especially designed for carrying out the process of the direct production of steel described in the specification of the French Patent No. 482978, the vertical body part 1 of the furnace is provided in open and uninterrupted communication with a laterally extending part 2 of a form permitting of the collection of a relatively great quantity of homogeneous melted metal. In the body part 1 of the furnace are formed openings of a convenient number. The openings 3 serve for taking samples for determining the progress of the reduction within the furnace. The orifices 4 conveniently provided in vertical series in the body of the furnace are destined for the reception of burners 8 such as described in the specification of a co-pending application, and whereby liquid fuel and air may be injected into the furnace.

In the crown of the lower part 2 of the furnace are also provided apertures 5 preferably inclined, as illustrated in Figure 3, these apertures being provided for the reception of burners similar to those provided in the openings 4, or for electrodes for the electric heating of the lower part of the furnace and the charge therein. The electric heating it will be understood permits besides, of effecting the refining of the metal collected in the lower part of the furnace.

Further an opening 6 is provided in the lower part of the furnace for the outlet of slag. The lower part of the furnace is also open at 7 (Figures 1 and 2) for the outward passage of the metal.

During working the orifices 4 which are not utilized, that is to say those in which burners 8 are not mounted, are closed in a known manner by means of refractory blocks as illustrated in Figure 2.

A shaft furnace thus provided lends itself particularly well to carrying out the process of direct production of steel described in the specification of the French Patent No. 482,978. It presents notable advantages with reference to the shaft furnace diagrammatically represented upon the drawing annexed to the said specification. In the latter apparatus the tuyeres employed for the injection of combustible liquid are fixed in open positions around the furnace. The tuyeres for example of the burners 8 according to the present invention may, be disposed at convenient points in such manner as to assure the best utilization of the apparatus.

The upper part of the shaft furnace may be constructed as described in the specification of the prior French patent referred to.

In such a shaft furnace the openings provided for taking samples for the control of the progress of the operation are preferably closed by doors having a particular construction the subject matter of a copending application. These doors have a more convenient operation than the closing blocks usually employed for the purpose.

The apparatus described permits by the combination of its elements of the production of a shaft furnace for the direct manufacture of steel. The arrangement of the laterally extending lower part of the furnace with means for the optional electric heating offers the advantage of producing very high temperatures as well as the refining of the metal. It permits besides of collecting a great quantity of melted metal and of avoiding too frequent tapping. The withdrawal of slag may be effected as often as is necessary by means of the opening provided for this purpose.

In such a shaft furnace it is possible to produce special steels or a metal such as ferromanganese, either in effecting the necessary additions in the laterally extending lower part of the furnace before running the metal or in treating special charges. This method of working is rendered possible by the very high temperatures that it is possible to realize by the heating with combustible liquids.

The utilization of combustible liquids or of gases instead of solid fuel offers a very important advantage not only in the production of high temperatures, but also having regard to the facility of conducting operations and of controlling the progress of operations in shaft furnaces.

I claim:

1. A furnace for the direct production of steel, consisting of a vertical shaft or body part, a laterally extending part at the lower end thereof in open and in uninterrupted communication with the said vertical shaft or body part, means for supplying heat in the said laterally extending part, and a series of holes in the said vertical shaft or body part for the reception of burners, substantially as described.

2. A furnace for the direct production of steel, consisting of a vertical shaft or body part, means for applying heat therein, a laterally extending part at the lower end thereof in open and uninterrupted communication with the vertical shaft or body part, said laterally extending part being adapted for electrical heating by the provision of holes therein for the reception of electrodes, substantially as described.

CHRISTIAN de THAL.